United States Patent
Dendl et al.

(10) Patent No.: US 7,509,273 B2
(45) Date of Patent: Mar. 24, 2009

(54) SALES SUPPORT METHOD AND SYSTEM FACILITATING DOCUMENT MODIFICATION

(75) Inventors: Stefan P. W. Dendl, Kaiserslautern (DE); Michael P. Dietrich, Bexbach (DE)

(73) Assignee: SAP AG, Walldorf (DE)

( * ) Notice: Subject to any disclaimer, the term of this patent is extended or adjusted under 35 U.S.C. 154(b) by 711 days.

(21) Appl. No.: 11/063,379

(22) Filed: Feb. 22, 2005

(65) Prior Publication Data

US 2006/0190431 A1 Aug. 24, 2006

(51) Int. Cl.
*G06Q 30/00* (2006.01)
*G06F 17/30* (2006.01)

(52) U.S. Cl. .............................. 705/26; 705/1; 705/27; 705/28

(58) Field of Classification Search ..................... 705/1, 705/26–28
See application file for complete search history.

(56) References Cited

U.S. PATENT DOCUMENTS

| | | | | |
|---|---|---|---|---|
| 5,897,623 | A * | 4/1999 | Fein et al. ..................... | 705/27 |
| 7,249,044 | B2 * | 7/2007 | Kumar et al. .................. | 705/8 |
| 2001/0054009 | A1 * | 12/2001 | Miller et al. ................... | 705/26 |
| 2002/0023004 | A1 * | 2/2002 | Hollander et al. ............. | 705/22 |
| 2002/0042755 | A1 * | 4/2002 | Kumar et al. .................. | 705/26 |
| 2002/0042757 | A1 * | 4/2002 | Albazz et al. .................. | 705/26 |
| 2002/0046209 | A1 * | 4/2002 | De Bellis ....................... | 707/10 |
| 2003/0105683 | A1 * | 6/2003 | Fratarcangeli et al. ......... | 705/27 |
| 2004/0034578 | A1 * | 2/2004 | Oney et al. .................... | 705/28 |
| 2005/0086122 | A1 * | 4/2005 | Cirulli et al. .................. | 705/26 |

OTHER PUBLICATIONS

"101 hot tips for Word for Windows. (Microsoft Corp.'s Word for Windows 2.0 word processing software) (Tutorial)". Beinhorn, George. PC-Computing, v5, n10, p. 122(22). Oct. 1992. [recovered from Dialog on Dec. 17, 2008].*

"CGE&Y launches web-based tool designed to reduce coding errors, delays in claims processing". Anonymous. Health Care Strategic Management v21n6 pp. 9. Jun. 2003. [recovered from Dialog on Dec. 17, 2008].*

* cited by examiner

*Primary Examiner*—Jeffrey A. Smith
*Assistant Examiner*—William J. Allen
(74) *Attorney, Agent, or Firm*—Kenyon & Kenyon LLP

(57) ABSTRACT

The present invention provides a system and method for controlling review of large documents. Purchasers who use computers to place orders may review a subset of selected items within the orders to ease review. The system may detect orders having items that exceed a specified threshold. The system may allow an operator to search for a subset of one or more items to review if the number of items exceeds the threshold. For example, an operator may search for a particular product using a product code or may search for a group of products using search terms. The system will then display the search results, rather than the entire order. The system may display the specified threshold number of items, if the search results exceeds the threshold. Thus, the system eases navigation within large documents, such as purchase orders and other sales documents that may contain many line items.

24 Claims, 5 Drawing Sheets

300

SALES SUPPORT METHOD AND SYSTEM FACILITATING DOCUMENT MODIFICATION

BACKGROUND

Companies that engage in commercial transactions often communicate to each other to negotiate terms of their transactions. For example, purchasers who wish to purchase an item may send a purchase order to a supplier. The purchase order may set forth the number of items that are requested, the price, and a requested delivery date. The supplier may respond with a confirmation or with an alternate proposal setting forth items that can be delivered, a price and dates that the supplier is able to deliver these items.

Businesses are using computer technology to improve their operations. For example, suppliers may allow purchasers to place electronic orders for goods or services using their computer terminal. These electronic orders may be placed via an information network such as the World Wide Web ("WWW"). The supplier's computer system may support portal-based communication with a browser at the purchaser's computer system. The purchaser may be presented with information via a web page, which can be modified as requested.

Electronic Data Interchange (EDI) may be used to communicate business transactions, such as orders, confirmations and invoices, between organizations electronically. Exemplary EDI protocols include protocols standardized by the American National Standards Institute (ANSI) such as X.12, UN/EDIFACT, and VDA/ODETTE. An EDI protocol may transfer data in files by synchronizing the time of transfer of the files between the system that is sending the data and the system that is receiving the data.

Some orders that are placed are large and may include, for example, thousands of line items where each line item specifies a product to be ordered, a quantity and other conventional commercial terms. Orders may be reviewed and revised by a purchaser while the order resides on a supplier's computer system awaiting fulfillment. Browsing through an order that contains thousands of line items is labor-intensive and arduous. A less difficult user interface is needed for browsing large orders.

DETAILED DESCRIPTION

The present invention provides a system and method for controlling review of large documents. Purchasers who use computers to place orders may review a subset of selected items within the orders to ease review. The system may detect orders having items that exceed a specified threshold. The system may allow an operator to search for a subset of one or more items to review if the number of items exceeds the threshold. For example, an operator may search for a particular product using a product code or may search for a group of products using search terms. The system will then display the search results, rather than the entire order. The system may display the specified threshold number of items, if the search results exceed the threshold. Thus, the system eases navigation within large documents, such as purchase orders and other sales documents that may contain many line items.

Figure 1:
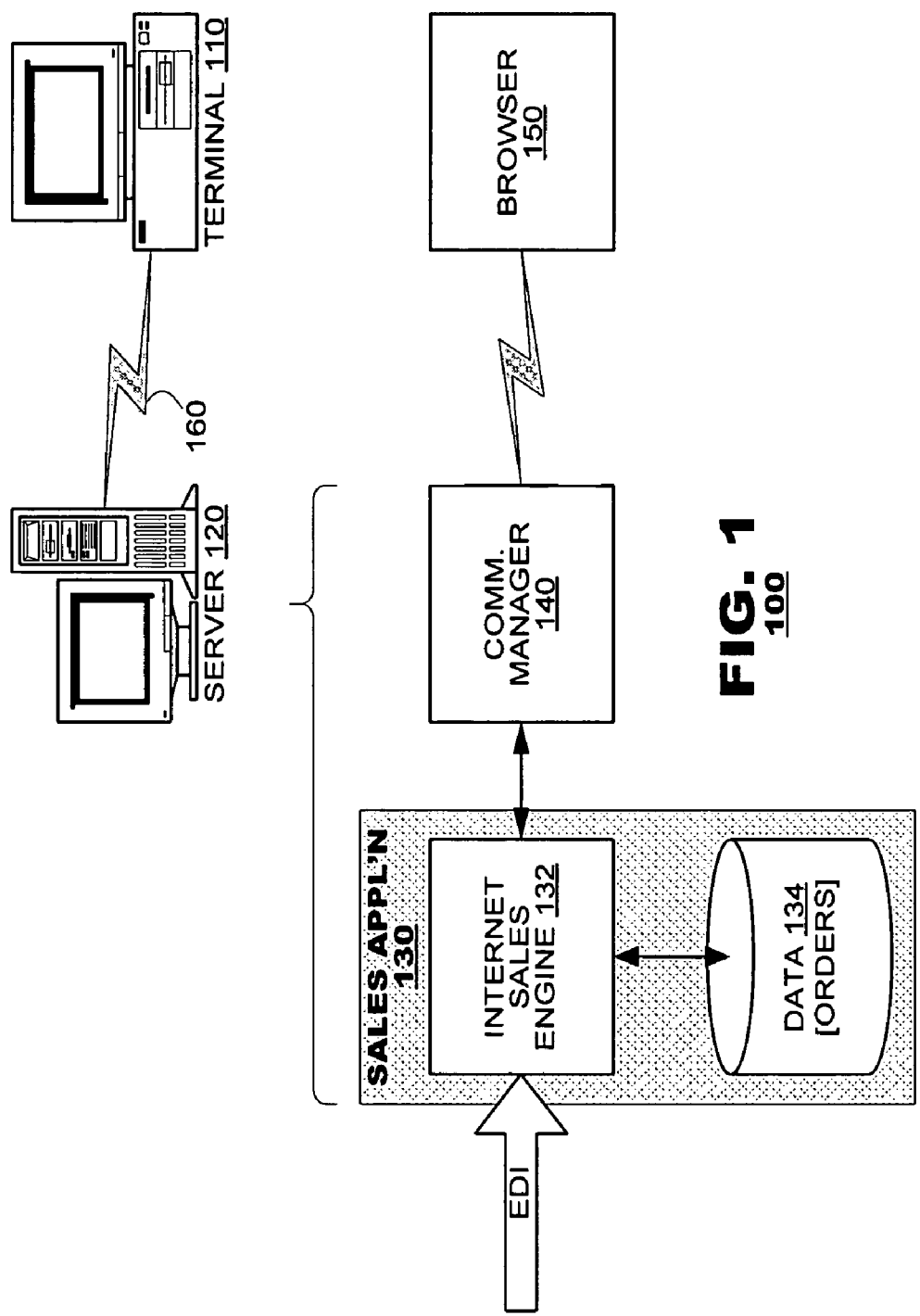
FIG. 1 illustrates a system block diagram according to one embodiment of the invention.

FIG. 1 illustrates a system block diagram 100 according to one embodiment of the invention. The computer system may comprise a terminal that is connected to a server 120 via a communication network 160 to access a sales application 130.

The terminal 110 may be a device having an input and an output through which a customer can interact with the server 120 (e.g., a client computer having a graphical user interface (GUI) or a Web browser). The terminal 110 may support a browser 150 that provides an interface into a vendor's system. The browser 150 may be executable software that allows an operator to view a collection of data, such as that presented by the sales application 130. The browser 150 may serve as a front-end to the World Wide Web. The browser 150 may be Microsoft's Internet Explorer, Netscape Navigator or another executable software program that allows the operator to view data.

The server 120 may support a sales application 130. The sales application 130 may be a set of files (e.g., executables, configuration files, and/or ancillary files) that provide data entry, query, update and/or report programs customized for sales of goods or services. The sales application 130 may be part of a customer relationship management (CRM) system that provides customer relationship management functions such as storing data representing customer profiles, determining who has purchasing authority, and/or maintaining past order histories. In an alternate embodiment of the invention, the transaction may not be a sale, but may instead be selecting items to donate, selecting items to receive as a donation or another transaction involving selection or goods or services. A purchaser may initiate the process by entering an address such as a Uniform Resource Locator (URL) of an entry point such as a home page of the sales application 130. A URL is an address that defines a route to a file on a World Wide Web (HTTP) server. The operator will then be presented with the home page of the sales application 130 and can navigate the sales application 130 to browse product or service offerings. The operator may then place a new order or review or modify an existing order.

The sales application 130 may include a sales engine 132 and a database 134. The sales engine 132 may be executable software that processes an operator's requests to perform sales or other transactions. The database may be a machine-readable medium such as, for example, a database that stores data collected by the sales engine 132. The sales engine 132 may accept purchase orders or may provide other transactions to initiate or facilitate sale of goods or services. The database 134 may store data collected as a result of these transactions including, for example, purchase order numbers, items ordered, and delivery dates. If a customer selects to view or revise an order or other sales documents, the sales engine 132 retrieves the order information from the database 134 and displays it to the operator. Customers may submit large orders using an EDI protocol such as X.12, UN/EDIFACT, and VDA/ODETTE.

The communications manager 140 may support interactive communications with the operator of the terminal 110. The communications manager 140 may provide graphical user interfaces so that the operator can navigate through the sales application 130 to select goods or services for purchase, place orders, review or modify orders, or perform other transactions. The communications manager 140 may also interpret input received from the terminal 110.

The sales application 130 may be accessed via the communication network 160, which may be the Internet, a wired or a wireless network. A variety of communication protocols and network topologies are known to support data related transactions; distinctions among them are immaterial for the purposes of the present discussion unless specifically cited. The communication network 160 may also be a single connection between terminal 110 and server 120. In an alternate embodiment of the invention, a single processor performs the functions of the terminal 110 and the server 120. In another alternate embodiment, the server 120 is a network comprising multiple servers and/or databases.

Figure 2:
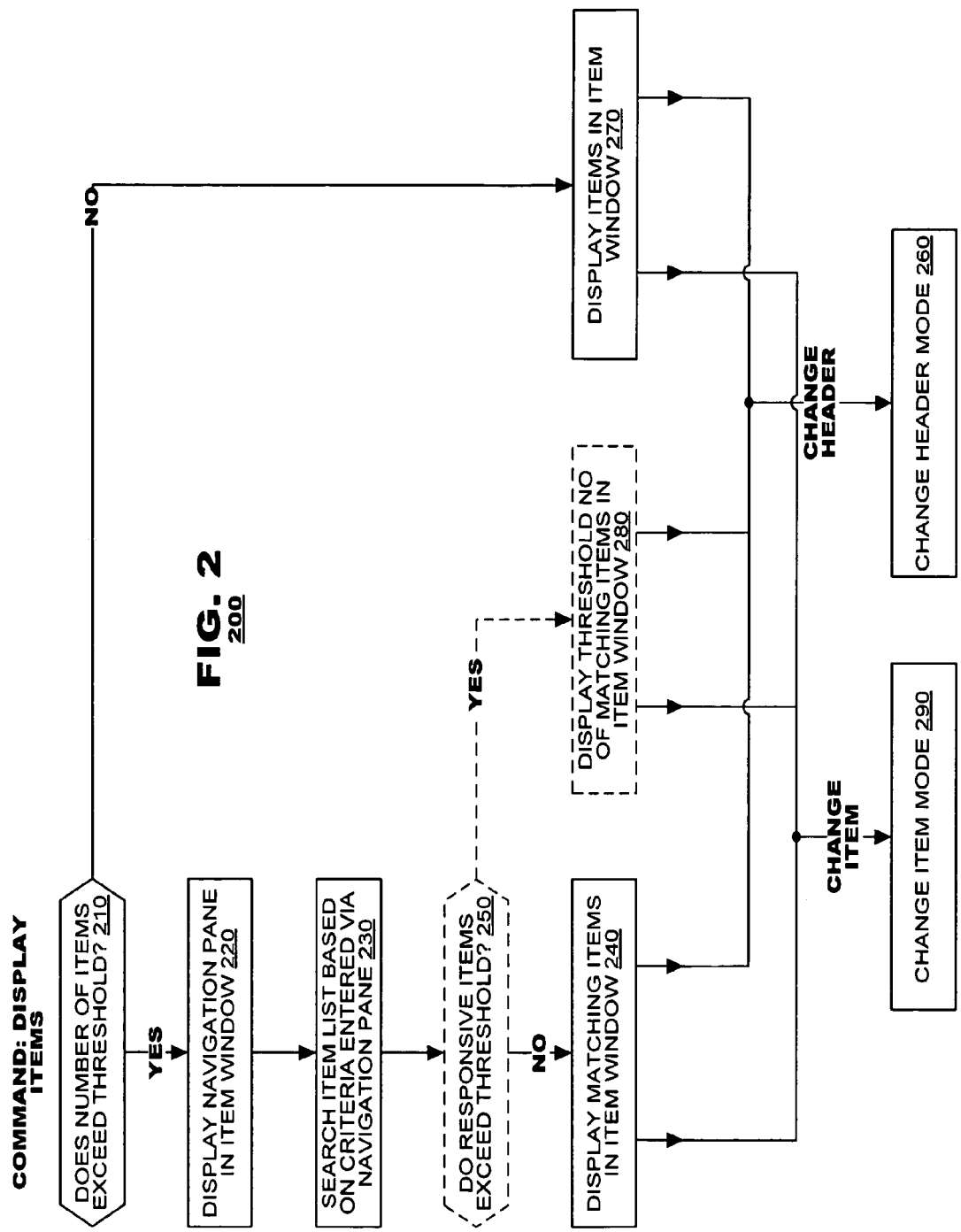
FIG. 2 illustrates a method for controlling review of large documents flow diagram according to one embodiment of the invention.

FIG. 2 illustrates a method for controlling review of large documents flow diagram 200 according to one embodiment of the invention. Review of large documents may be initiated by a request to review a document, such as a purchase order, an order confirmation or an invoice. The operator may enter identification information, such as the purchase order number, to retrieve the document that the operator wishes to review. In response to the request, the sales engine 132 may retrieve the document from the database 134.

In step 210, the sales engine 132 compares the number of items in the retrieved document to a threshold number. The threshold number of documents may be set to a number that is easily viewed by an operator, which may depend on the characteristics of the terminal 110. For example, if the terminal 110 is a personal computer, the operator may be able to view more line items than if the terminal 110 is a personal data assistant. Terminal characteristics may include the type of equipment, operating system and/or browser that is in use. When the document is retrieved from storage, the sales engine 132 may compare the number of items in the order to the threshold number retrieved from storage to determine if the number of items included in the document is greater than the threshold number. The number of items included in the document may be determined using various methods, e.g., it may be the number of the last item included in the document, it may be stored with the document or the sales engine 132 may count the number of items.

The threshold number of documents may set automatically based on the operating system and/or browser 150 in use on the terminal 110. When a terminal 110 initially establishes communication with the sales application 130, the sales application may query the terminal 110 to determine characteristics of the terminal 110. The sales application may retrieve from a table a threshold value corresponding to the terminal characteristics received in response to the query. The threshold number may be a default value based on these terminal characteristics or may be one or more configurable values that may be set by an administrator. In an alternate embodiment of the invention, the threshold value is not set automatically, but rather is either set by an operator or retrieved from storage to perform the comparison. If the threshold value is set by the operator, the sales engine 132 may display a window requesting the number of items that the operator wishes to view upon receipt a request to view a document. A default value may also be set that is used if the operator does not enter a value.

Step 220 is reached if the number of items exceeds the threshold. In step 220, the sales engine 132 queries the operator for search terms to narrow the number of items that will be displayed. The query may be in the form of a navigation pane that is presented to the operator. The navigation pane may include a field so that the operator can enter a product code to retrieve a particular line item that was ordered. The navigation pane may include one or more fields and controls so that an operator can enter search terms to search specific fields of the document or to search the entire document. One of the fields may be a status. The operator may search for line items having a particular status, e.g., "shipment delayed" or "shipped." The navigation pane may also include an option to allow an operator to display a number of items that is less than or equal to the threshold number of line items. If the operator selects this option, and, for example, the threshold is set to 100, the first 10, 20, or 100 items may be displayed.

In step 230, the sales engine 132 retrieves the items selected by the operator. For example, if the operator entered a product code, the sales engine 132 searches the items of the document and retrieves the line item corresponding to the product code entered by the operator. If the operator entered search terms, the sales engine 132 searches the items of the document for items containing the terms provided by the operator and retrieves items that meet the operator's criteria. If the operator did not enter search terms but rather selected to just review the first items of the order up to a limit specified by the operator, the sales engine 132 retrieves these the first items up to the number selected by the user.

The system may maintain both external customer product codes and internal product codes. External customer product codes may be product codes that are entered by operators of the system. Internal product codes may be stored internally by the system, for example, by database 134 and may provide a tracking mechanism for internal processing. If the system resides in a CRM system, the CRM system may maintain both sets of codes so that the sales engine 132 can use only a single set of codes. External product codes and corresponding internal product codes may be stored, e.g., in translation tables or objects so that codes can be translated.

In step 240, the system displays the items that satisfy the requirements specified by the operator. The items that were retrieved in step 230 are displayed to the user via, for example, a graphical user interface provided by the communications manager 140. The graphical user interface may allow the operator to modify the document. The sales application 130 may support two modes, "change item mode," in which only the item being modified is locked and "change header mode," in which the entire document is locked.

Step 290 is performed if the sales application 130 is operating in change item mode. In step 290, since only an item that is being modified, multiple operators may modify a document at the same time. If an operator attempts to modify an item within a document while another operator modifies another item within that document, the operator may proceed as long as the line item that the operator wishes to modified is not in use.

Step 260 is performed if the sales application 130 is operating in change header mode.

In step 260, since the complete document is locked, it can be changed by only a single operator. If another operator attempts to modify the document, an error message will be displayed, which may indicate that the operator should attempt the change at a later time when the document is not opened. Change header mode may be used when changes to the header of a document requires changes to line items. A document header may include the recipient, the delivery address, and the delivery date. If, for example, an operator chooses to change the delivery date to an earlier date, some items may not be available on the earlier date. The sales application 130 may retrieve availability dates of each of the items ordered and present the operator with various alternatives to select from to replace those items that cannot be delivered on the earlier date.

In an alternate embodiment of the invention, in step 250, before displaying the items that satisfy the requirements specified by the operator, the sales engine 132 first compares the number of items that were retrieved with the threshold. If the number of items that were retrieved exceeds the threshold, processing may proceed to step 280 and the display may be limited to the threshold number of items. In one embodiment of the invention, items may have associated sub-items. The system may display the threshold number of items, which will be exceeded by sub-items associated with displayed items. Alternatively, the system may compare the total number of items and sub-items and only display a number of items that is within the threshold limit.

To limit entries to the threshold limit, the sales engine 132 may display the items in sequence as they were retrieved in the search up to the threshold limit. Alternate embodiments are possible that include displaying one or more additional navigation panes to prompt the operator to further limit the search, if the operator would like.

In one embodiment of the invention, the system may permit an operator to display a next page, if the number of items exceeds the threshold limit. The operator may click on a next page button and the system will display the next items sequentially in the search results retrieved in step 230 that could not be displayed because the threshold was exceeded.

If in step 210, the number of items does not exceed the threshold, step 270 is performed and the items that were retrieved in step 210 are displayed.

Figure 3:
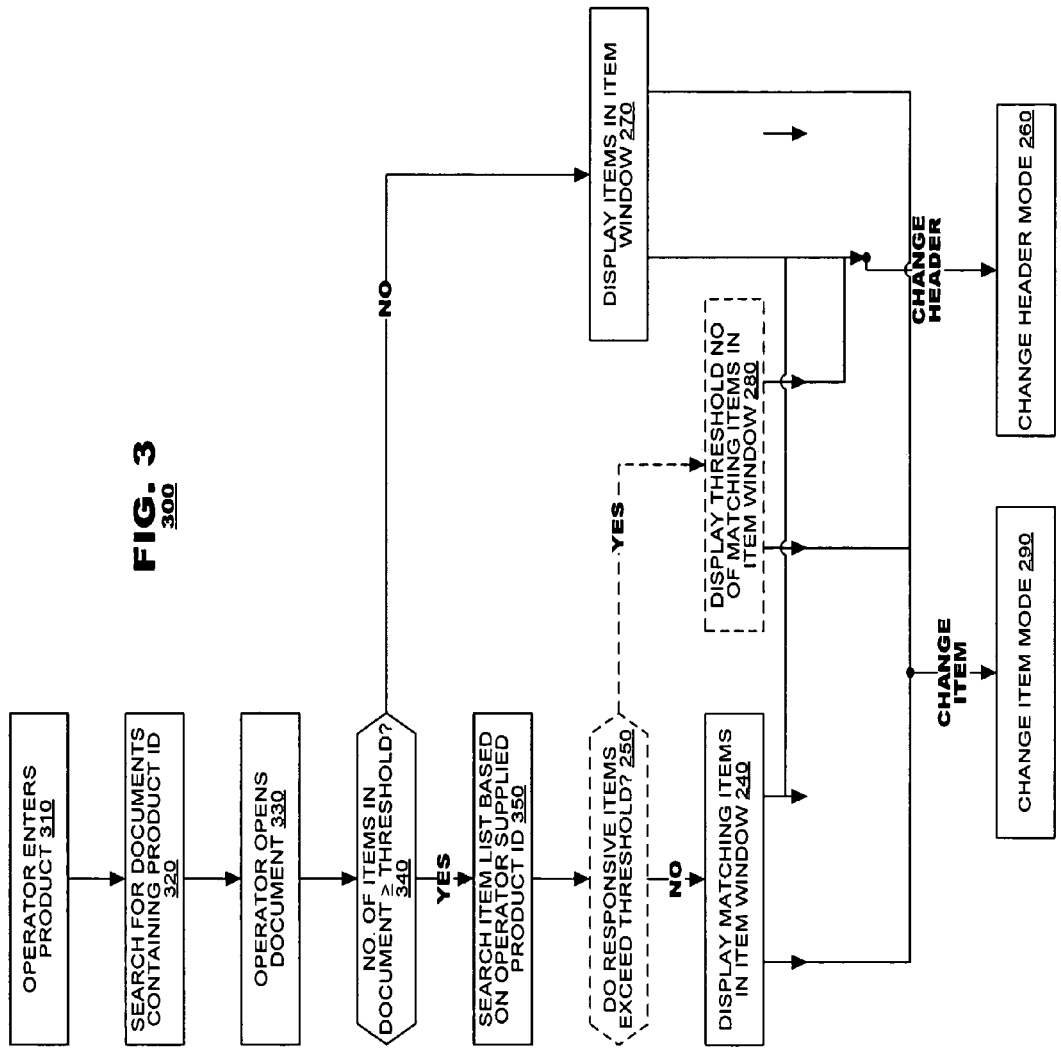
FIG. 3 depicts a method for searching for and controlling review of large documents flow diagram according to one embodiment of the present invention.

FIG. 3 depicts a method for searching for and controlling review of large documents flow diagram 300 according to one embodiment of the present invention. Review of large documents may be initiated by a request to review documents that contain information about a particular product. In step 310, an operator enters a product code. If the system maintains two product codes, an external product code and an internal product code, the operator may provide an external code. A corresponding internal code may be retrieved using the external code supplied by the operator. The product code entered by the operator may be stored temporarily, for example, in a cache for possible later retrieval.

In step 320, the sales engine 132 searches for documents containing the product identifier supplied by the operator. The sales engine 132 may query the database 134 for documents having a product code or identifier matching that supplied by the operator. The database 134 responds by providing the documents matching the supplied criteria. The responsive documents are displayed to the operator.

In step 330, the operator selects to open a document. In step 340, upon receipt of the command to open a document, the sales engine 132 compares the number of items in the retrieved document to the threshold number. When the document is retrieved from storage, the sales engine 132 may compare the number of items in the order to the threshold number to determine if the number of items included in the document is greater than the threshold number.

Step 350 is reached if the number of items in the document exceeds the threshold. In step 350, the sales engine 132 retrieves the product identifier supplied by the operator from short term memory, searches the items of the document and retrieves the items from the document that include the product identifier supplied by the operator. In an alternate embodiment of the invention, the operator may be presented with a navigation pane to allow the operator to select other criteria to narrow the number of items that are displayed. For example, the navigation pane may allow the operator to provide search terms and/or may allow the operator to select to just received the initial items of the list up to the threshold number.

Processing may proceed to either steps 240 or 250. In step 240, the system displays the items that satisfy the requirements specified by the operator. The items that were retrieved are displayed to the user via, for example, a graphical user interface provided by the communications manager 140. Processing continues as described with respect to FIG. 2.

In step 250, before displaying the items that satisfy the requirements specified by the operator, the sales engine 132 first compares the number of items that were retrieved with the threshold. Processing then proceeds as described with respect to FIG. 2.

Figure 4:
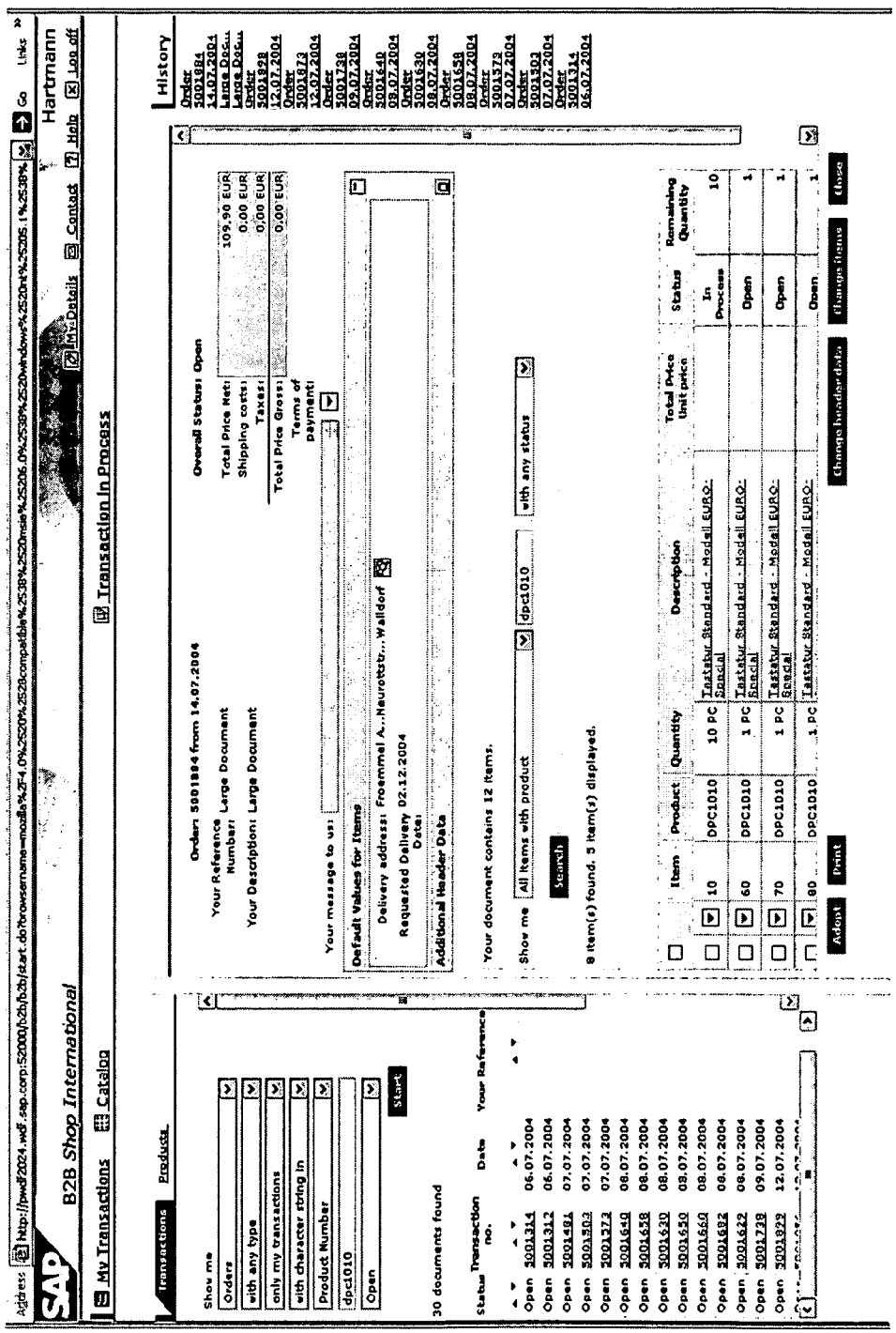
FIG. 4 shows a navigation pane within a graphical user interface according to one embodiment of the invention.

FIG. 4 shows a navigation pane within a graphical user interface 400 according to one embodiment of the invention. The navigation pane may have a field for an operator to include a product identifier and a status. Other fields may be included in a navigation pane to allow for additional searches by the operator.

Figure 5:
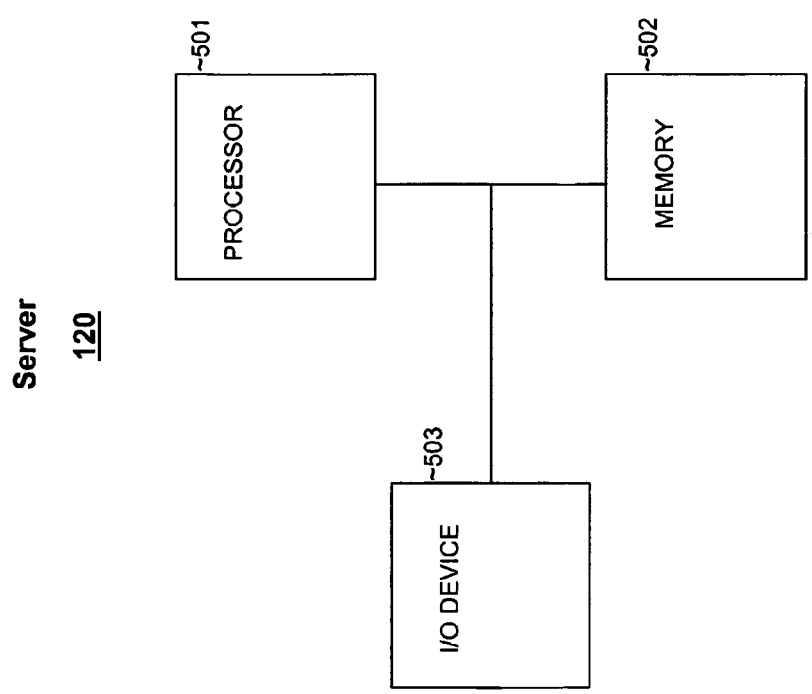
FIG. 5 shows a structure of a server according to one embodiment of the invention.

FIG. 5 shows a structure of a server 120 according to one embodiment of the invention. The server 120 includes a processor 501, memory 502, and an input/output (I/O) device 503. The processor 501 is connected to the memory 502. The processor 501 is also connected to the I/O device 503. These connections are direct or via other internal electronic circuitry or components.

The processor 501 may be a programmable processor that executes instructions residing in memory 502 to receive and send data via the I/O device 503 including a programmable microprocessor or combination of microprocessors or processors that can operate on digital data, which may be special or general purpose processors coupled to receive data and instructions from, and to transmit data and instructions to, a machine-readable medium. According to one embodiment of the present invention processor 501 is an Intel microprocessor.

Memory 502 may be a machine-readable medium that stores data that is processed by the processor 501 including a computer program product, apparatus and/or device (e.g., a random access memory (RAM), read only memory (ROM), magnetic disc, optical disc, programmable logic device (PLD), tape, or a combination of these devices). This may include external machine-readable mediums that are connected to the processor 501 via the I/O device 503.

The I/O device 503 may be a coupling that receives and/or send digital data to and from an external device.

Various implementations of the systems and techniques described here can be realized in a processing systems and/or digital electronic circuitry, integrated circuitry, specially designed ASICs (application specific integrated circuits), computer hardware, firmware, software, and/or combinations thereof.

A number of embodiments of the invention have been described. Nevertheless, it will be understood that various modifications may be made without departing from the spirit and scope of the invention.

What is claimed is:

1. At an automated sales support system, a browsing method comprising:
    responsive to a request containing a document identifier, accessing data representing a document corresponding to the document identifier;
    comparing a number of products listed in the document to a predetermined threshold;

if the number exceeds the threshold, generating a portal page that lists a subset of products that is equal to or less than the predetermined threshold;

otherwise, generating a portal page that lists all of the products;

returning the portal page in response to the request;

receiving a selection of a mode for modifying data presented in the portal page;

if a first modification mode is selected, receiving a selection of a product listed in the document to modify; and if the selected product listing is not being modified at the time of the selection, locking the product listing in the document to prevent modification of the product listing by more than one user; and if a second modification mode is selected, receiving modifications to a header of the document, the header including a recipient of the document, a delivery date associated with the document, and a delivery address associated with the recipient; and comparing modifications to the document header with the products or the subset of products listed in the portal page, wherein if the modifications render certain ones of the products or the subset of products unavailable, returning a list of alternative products to replace the unavailable products.

2. The method of claim 1, wherein the subset is obtained by performing a search for items containing terms supplied by an operator.

3. The method of claim 1, wherein the subset is obtained by performing a search for items containing a product supplied by an operator.

4. The method of claim 1, wherein the subset is obtained by performing a search for items containing a status supplied by an operator.

5. The method of claim 1, wherein the number of the products in the document is obtained by retrieving a sequence number of a last of the products.

6. The method of claim 1, wherein the number of the products in the document is obtained by counting the products within the document.

7. The method of claim 1, wherein the number of the products in the document is stored with the document.

8. The method of claim 1, wherein the predetermined threshold is set automatically based on characteristics of a terminal used by an operator accessing the document.

9. The method of claim 1, wherein the predetermined threshold is set by an operator in a navigation pane.

10. The method of claim 1, wherein the predetermined threshold is set to a default value stored by the system.

11. The method of claim 1, further comprising responsive to operator input, modifying the document in accordance with the input.

12. The method of claim 11, wherein multiple operators may modify the document at the same time.

13. At an automated sales support system, a computer readable medium storing thereon program instructions that, when executed, cause an executing device to:

responsive to a request containing a document identifier, access data representing a document corresponding to the document identifier;

compare a number of products listed in the document to a predetermined threshold;

if the number exceeds the threshold, generate a portal page that lists a subset of products that is equal to or less than the predetermined threshold;

otherwise, generate a portal page that lists all of the products;

return the portal page in response to the request;

receiving a selection of a mode for modifying data presented in the portal page;

if a first modification mode is selected, receiving a selection of a product listed in the document to modify; and if the selected product listing is not being modified at the time of the selection, locking the product listing in the document to prevent modification of the, product listing by more than one user; and if a second modification mode is selected, receiving modifications to a header of the document, the header including a recipient of the document, a delivery date associated with the document, and a delivery address associated with the recipient; and comparing modifications to the document header with the products or the subset of products listed in the portal page, wherein if the modifications render certain ones of the products or the subset of products unavailable, returning a list of alternative products to replace the unavailable products.

14. The computer readable medium of claim 13, wherein the subset is obtained by performing a search for items containing terms supplied by an operator.

15. The computer readable medium of claim 13, wherein the subset is obtained by performing a search for items containing a product supplied by an operator.

16. The computer readable medium of claim 13, wherein the subset is obtained by performing a search for items containing a status supplied by an operator.

17. The computer readable medium of claim 13, wherein the number of the products in the document is obtained by retrieving a sequence number of a last of the products.

18. The computer readable medium of claim 13, wherein the number of the products in the document is obtained by counting the products within the document.

19. The computer readable medium of claim 13, wherein the number of the products in the document is stored with the document.

20. The computer readable medium of claim 13, wherein the predetermined threshold is set automatically based on characteristics of a terminal used by an operator accessing the document.

21. The computer readable medium of claim 13, wherein the predetermined threshold is set by an operator in a navigation pane.

22. The computer readable medium of claim 13, wherein the predetermined threshold is set to a default value stored by the system.

23. The computer readable medium of claim 13, further comprising instructions that cause the executing device to responsive to operator input, modify the document in accordance with the input.

24. The computer readable medium of claim 23, wherein multiple operators may modify the document at the same time.

* * * * *